United States Patent
Snyder

(10) Patent No.: US 9,735,859 B1
(45) Date of Patent: Aug. 15, 2017

(54) METHOD AND APPARATUS FOR DISTRIBUTING ADDRESSES OF COMMUNICATION DEVICES WITHIN A SATELLITE NETWORK

(71) Applicant: VT iDirect, INC., Herndon, VA (US)

(72) Inventor: Brian Scott Snyder, Ashburn, VA (US)

(73) Assignee: VT iDirect, Inc., Herndon, VA (US)

( * ) Notice: Subject to any disclaimer, the term of this patent is extended or adjusted under 35 U.S.C. 154(b) by 370 days.

(21) Appl. No.: 14/092,508

(22) Filed: Nov. 27, 2013

(51) Int. Cl.
*H04B 7/185* (2006.01)

(52) U.S. Cl.
CPC ............................ *H04B 7/18517* (2013.01)

(58) Field of Classification Search
CPC ......................................................... H04B 7/185
See application file for complete search history.

(56) References Cited

U.S. PATENT DOCUMENTS

| | | | |
|---|---|---|---|
| 2004/0081171 A1* | 4/2004 | Finn | H04L 12/462 370/395.53 |
| 2007/0147279 A1* | 6/2007 | Smith et al. | 370/316 |
| 2008/0240100 A1* | 10/2008 | Smith | H04L 12/4641 370/392 |
| 2009/0327412 A1* | 12/2009 | Lepeska | 709/203 |
| 2010/0172234 A1* | 7/2010 | Thesling | 370/206 |
| 2012/0063363 A1* | 3/2012 | Li | H04L 12/4645 370/255 |

* cited by examiner

*Primary Examiner* — Chi H Pham
*Assistant Examiner* — Fahmida Chowdhury
(74) *Attorney, Agent, or Firm* — Oblon, McClelland, Maier & Neustadt, L.L.P.

(57) ABSTRACT

A method of communication in a satellite network including a hub, a satellite, a remote terminal, an upstream switch connected to the hub, at least one upstream communication device connected to the upstream switch, and plural remote-connected communication devices connected to the remote terminal, is disclosed. In an embodiment, the method comprises receiving at the hub, via the satellite from the remote terminal, a correspondence information carrying message including plural correspondence information entries, each correspondence information entry identifying a virtual network identifier associated with a media access control (MAC) address of one of the plural remote-connected communication devices connected to the remote terminal; and transmitting a data carrying message from one of the upstream communication devices to one of the plural remote-connected communication devices via the hub, the satellite and the remote terminal based on a correspondence information entry in the correspondence information carrying message.

20 Claims, 10 Drawing Sheets

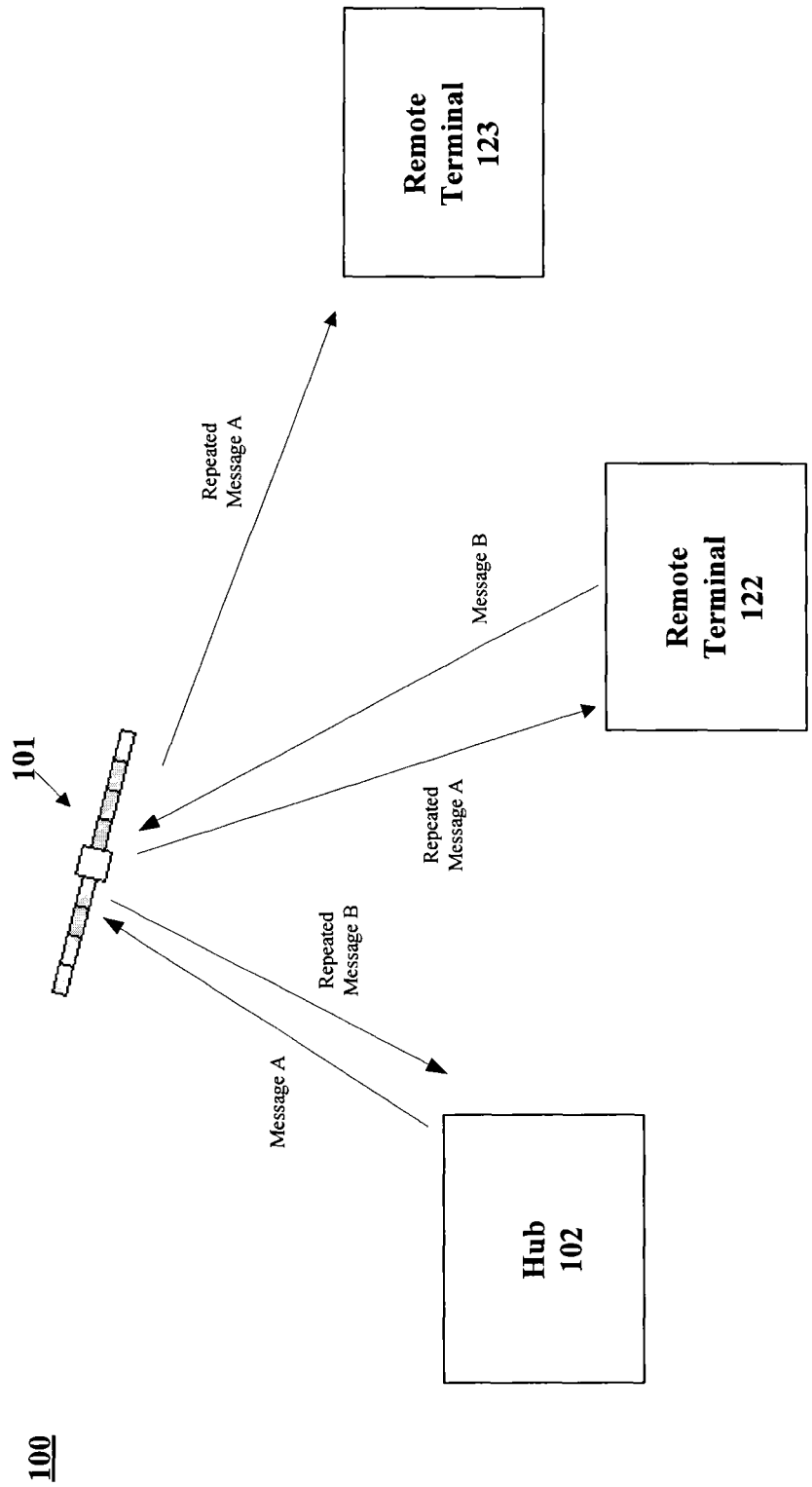

FIG. 6(a)

| Connection Type | MAC Address | SVN Identifier |
|---|---|---|
| Ethernet | MAC A | SVN X |
| Ethernet | MAC B | SVN X |
| Ethernet | MAC C | SVN X |
| Ethernet | MAC D | SVN Y |

FIG. 6(b)

| Connection Type | MAC Address | SVN Identifier |
|---|---|---|
| Terminal ID 1 | MAC 1 | SVN 11 |
| Terminal ID 1 | MAC 2 | SVN 11 |
| Terminal ID 1 | MAC 3 | SVN 12 |
| Terminal ID 2 | MAC 4 | SVN 11 |
| Terminal ID 2 | MAC 5 | SVN 12 |
| Terminal ID 2 | MAC 6 | SVN 12 |
| Terminal ID 3 | MAC 7 | SVN 12 |
| Terminal ID 3 | MAC 8 | SVN 13 |

METHOD AND APPARATUS FOR DISTRIBUTING ADDRESSES OF COMMUNICATION DEVICES WITHIN A SATELLITE NETWORK

BACKGROUND

This disclosure relates in general to satellite communication and, in particular, to a method and apparatus for distributing address information for communication devices within a satellite network.

A layer 2 (L2) network switch links devices based on a destination media access control (MAC) address. A conventional switch's function is to receive a packet and select a physical switch port to which the packet should be forwarded based on the destination MAC address. By monitoring all traffic, the switch builds a mapping table of addresses, commonly referred to as a forwarding information base (FIB), and the switch uses information in the FIB to switch packets addressed to known MAC addresses to direct traffic to the correct port of the switch. When the switch encounters a packet with a destination MAC address that is not recognized, the switch may broadcast (aka, flood) the packet to all of the switch ports (except the originator port through which the packet was received), until the switch learns a specific path to the host destination.

SUMMARY

According to some embodiments, a method of communication in a satellite network including a hub, a satellite, a remote terminal, an upstream switch connected to the hub, at least one upstream communication device connected to the upstream switch, and plural remote-connected communication devices connected to the remote terminal, the method comprising receiving at the hub, via the satellite from the remote terminal, a correspondence information carrying message including plural correspondence information entries, each correspondence information entry identifying a virtual network identifier associated with a media access control (MAC) address of one of the plural remote-connected communication devices connected to the remote terminal; and transmitting a data carrying message from one of the upstream communication devices to one of the plural remote-connected communication devices via the hub, the satellite and the remote terminal based on a correspondence information entry in the correspondence information carrying message.

According to some embodiments, the method may further comprise storing the plural correspondence information entries in a hub database at the hub, and storing in the hub database, for each correspondence information entry, a terminal identifier of the remote terminal having the MAC address. The method may further comprise transmitting, from the hub to each of the at least one upstream communication devices, device identification messages for each of the MAC addresses stored in the hub database, each device identification message including a different MAC address stored in the hub database and a corresponding virtual network identifier.

According to some embodiments, the method may further comprise transmitting, from the hub to each of the at least one upstream communication devices, device identification messages for each of the MAC addresses in the correspondence information carrying message, each device identification message including a different MAC address and a corresponding virtual network identifier from the correspondence information carrying message.

According to some embodiments, the method may further comprise detecting, by the remote terminal, the data carrying message transmitted to at least one of the plural remote-connected communication devices connected to the remote terminal, the message identifying a MAC address and an associated virtual network identifier of the one of the plural remote-connected communication devices connected to the remote terminal, storing a correspondence information entry in a remote-terminal database, the correspondence information entry identifying a correspondence between the MAC address and the associated virtual network identifier of the one of the plural remote-connected communication devices connected to the remote terminal in the detected message, and copying the correspondence information entry identifying the MAC address and the associated virtual network identifier from the remote-terminal database to a correspondence information carrying message prior to transmission of the correspondence information carrying message to the hub.

The detecting may be performed when the remote terminal is disconnected from the hub, and the method may further comprise transmitting the correspondence information carrying message from the remote terminal to the hub when a link is established between the remote terminal and the hub. Further, the data carrying message may include a MAC address of the one of the plural remote-connected communication devices connected to the remote terminal as a destination MAC address, a virtual network identifier of the one of the plural remote-connected communication device connected to the remote terminal, and a MAC address of the at least one upstream communication device as a source MAC address.

According to some embodiments, the method may further comprise storing, in the remote-terminal database, a correspondence between a connection type of a connection to the one upstream communication device, the MAC address of the one upstream communication device and the virtual network identifier of the one upstream communication device.

According to some embodiments, the method may further comprise transmitting a request message from the hub to the remote terminal, and transmitting the correspondence information carrying message in response to the request message. Alternatively, the satellite network further includes another remote terminal, and the remote terminal and the another remote terminal are members of a same virtual network.

According to some embodiments, the method may further comprise a first remote-connected communication device of the plural remote-connected communication devices is a member of a first virtual network, a second remote-connected communication device of the plural remote-connected communication devices is a member of a second virtual network, and the remote terminal is a member of the first virtual network and the second virtual network.

According to some embodiments, the method may further comprise transmitting the request message from the hub to the remote terminal when a link is established between the hub and the remote terminal. The link may established between the hub and the remote terminal in response to a restart process of the hub According to some embodiments, the method may further comprise transmitting, from the hub to each of the at least one upstream communication devices connected to the upstream switch, device identification messages for each of the MAC addresses stored in the hub database, each device identification message including a different MAC address stored in the hub database and a corresponding virtual network identifier when a link is disconnected between the remote terminal and the hub According to some embodiments, the method may further comprise detecting, by the hub, the data carrying message transmitted to at least one of the plural upstream communication devices, the data carrying message identifying a MAC address and a corresponding virtual network identifier of at least one of the at least one upstream communication devices, and storing, in the hub database, a correspondence between an Ethernet connection of the hub, the MAC address and the corresponding virtual network identifier of the at least one of the upstream communication devices in the detected message.

According to some embodiments, the virtual network identifier identifies a virtual network, and the remote terminal and the one of the plural remote-connected communication devices connected to the remote terminal are members of the virtual network.

According to some embodiments, the method may further comprise switching, by the hub, the message transmitted from the at least one upstream communication device to the remote terminal based on the virtual network identifier and the MAC address of the correspondence information entry in the correspondence information carrying message.

According to some embodiments, the virtual network identifier may identify a virtual network having an isolated namespace and a private switching table According to another embodiment, a method of satellite communication by a terminal in a satellite network including the terminal, a hub, a satellite, at least one upstream communication device, and plural terminal-connected communication devices connected to the terminal comprises generating a correspondence information carrying message including plural correspondence information entries, each correspondence information entry identifying a virtual network identifier associated with a MAC address of one of the plural terminal-connected communication devices, transmitting, to the hub via the satellite, the correspondence information carrying message, and transmitting a data carrying message from one of the upstream communication devices to one of the plural terminal-connected communication devices via the hub and the satellite that was generated by the hub based on a correspondence information entry in the correspondence information carrying message.

According to another embodiment, a hub device for communicating in a satellite network, the satellite network including the hub, a satellite, a remote terminal, an upstream switch connected to the hub, at least one upstream communication device connected to the upstream switch, and plural remote-connected communication devices connected to the remote terminal, the hub device comprising a receiver that receives, via the satellite from the remote terminal, a correspondence information carrying message including plural correspondence information entries, each correspondence information entry identifying a virtual network identifier associated with a media access control (MAC) address of one of the plural remote-connected communication devices connected to the remote terminal, and a transmitter that transmits a data carrying message from one of the upstream communication devices to one of the plural remote-connected communication devices via the satellite and the remote terminal based on a correspondence information entry in the correspondence information carrying message.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their example depictions do not in any way limit the scope of the present advancements embraced by the specification. The scope of the present advancements embraced by the specification and drawings are defined by words of the accompanying claims.

FIG. 3 illustrates an embodiment of packet repeating within a satellite network.

FIG. 6(a) illustrates an exemplary remote database in accordance with the present invention.

FIG. 6(b) illustrates an exemplary hub database in accordance with the present invention.

DETAILED DESCRIPTION OF THE PREFERRED EMBODIMENTS

Figure 1:
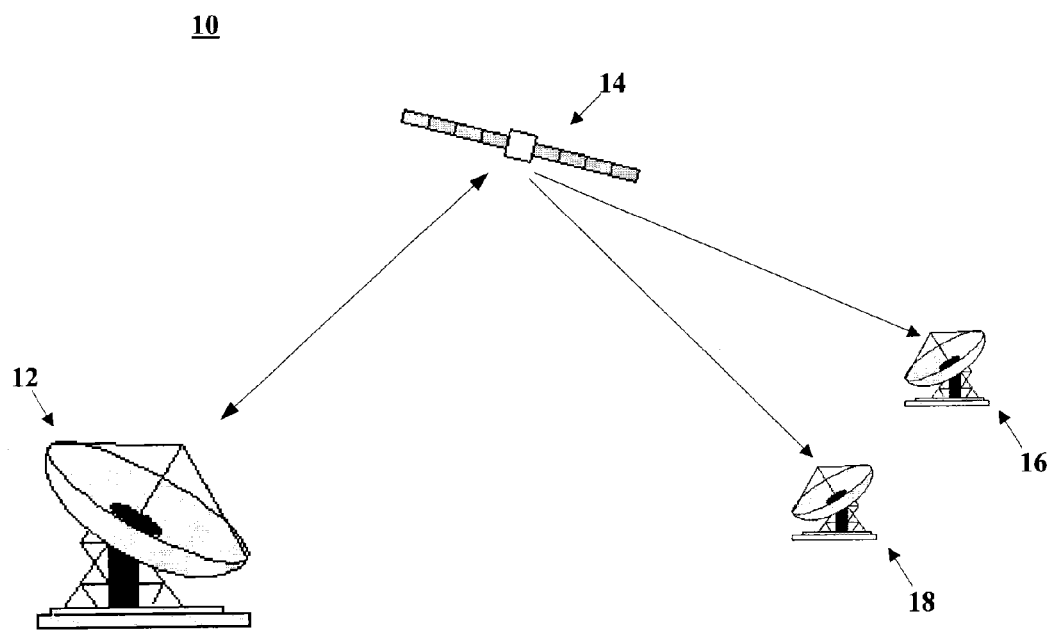
FIG. 1 illustrates an exemplary satellite network.

An alternative to the conventional switching approach may advantageously avoid the high-bandwidth cost and inefficiency of flooding over a satellite network in support of L2 switching. Referring now to the drawings, wherein like reference numerals designate identical or corresponding parts throughout the several views.

A satellite communication network may utilize a time division multiple access (TDMA) star topology. In this arrangement, there is a central station (i.e., the "hub") and multiple remote stations (i.e., remote terminals) that transmit messages to and from the hub via a satellite in earth orbit.

A satellite network configured in such a star topology may have multiple continuous carrier signals transmitted from the hub to the satellite. The satellite repeats the carrier signal for reception by all the remote terminals. A hub may support multiple such carriers, but a given remote terminal may only listen to a subset (e.g., one or two) of such carriers. Transmissions from the hub to the remote terminals are referred to as "outbound" and transmissions from the remote terminals to the hub are referred to as "inbound."

FIG. 1 illustrates an exemplary implementation of a satellite network. Satellite network 10 includes hub 12, satellite 14 and remote terminals 16 and 18. Hub 12 and remote terminals 16 and 18 may each be geographically located great distances apart. A TDMA plan may be implemented to provide a selection of carriers with different traffic-bearing capacities (e.g., different signal encodings, signal strength, signal frequencies, etc. . . . ) and levels of protection against adverse channel conditions. The characteristics of this plan may be broadcast from hub 12 to remote terminals 16 and 18 as control information.

A level of protection of a transmission may be a measure of its robustness against noise and other impairments. The level of protection can be adjusted by selecting different levels of transmission power, different carrier modulation schemes and different amounts of redundant information added in the channel coding process. Adjusting the level of protection involves a trade-off with the information-carrying ability of the transmission. Increasing the level of protection reduces the information-carrying ability and vice-versa.

Remote terminals 16 and 18 may determine their instantaneous needs for transmission capacity and communicate these to hub 12. In turn, hub 12 grants the remote terminals such capacity. As an example, the interval is commonly referred to as a TDMA frame. The method used for this operation takes into account differences in traffic or user priorities, fairness rules and many other criteria.

Hub 12 may include an antenna to communicate with remote terminals 16 and 18 over a transmission channel via satellite 14. According to some embodiments, hub 12 may assess the condition of the transmission channel from each remote terminal, by monitoring a quality of signals received and processing the results. Further, hub 12 may determine appropriate transmission parameters. Hub 12 may adjust to short-term variations in the capacity demand and channel conditions of individual remote terminals by assigning the remote terminals 16 and 18 time slots on carriers that have properties commensurate with their instantaneous needs and capabilities.

Hub 12 may also include a modem to convert analog signals into digital data, and to convert digital data into analog signals. The analog signals are transmitted to, and received from, satellite 14. The modem may be integrated into other hardware, and transmit and receive functions of the modem may be split into separate functional blocks.

On a longer time scale, hub 12 may adjust the carrier plan periodically to match prevailing conditions considered over the total population of remote terminals. These adjustments may be made to ensure the best overall statistical match between the capacity requested by remote terminals and the capacity and level of protection offered by the satellite network. A mismatch between the offered and demanded types of capacity and levels of protection can lead to inefficient use of the available bandwidth.

An example of a mismatch includes when the amount of capacity available with certain levels of protection is larger than needed. In such a case, satellite network 10 may not be able to make use of the excess capacity. Therefore, in this situation, some capacity may be wasted. Another example of a mismatch includes when the amount of capacity available with certain levels of protection is smaller than needed. In this case, the demands may not all be satisfied. Therefore, in this situation, some remote terminals may suffer degradation in quality of service.

An adaptive TDMA system may also include a number of sets of pre-defined carrier frequency plans. Each set may contain a number of individual carrier plans. The sets and their constituent plans may be assessed periodically in order to determine the best choice. Each set of carrier plans may be optimised for a particular composition of a remote terminal population, such that each set is designed for a given assumption about the number of active remote terminals of different types and with different technical characteristics. Alternatively, each set may contain a number of individual carrier plans, where each carrier plan is optimised for particular large-scale channel conditions, given the assumption about the terminal population that defines the set to which the plan belongs.

Further, a determination of the best carrier plan to use at any time may be performed in two stages. In a first stage, the best set of carrier plans is chosen based on the composition of the terminal population. In a second stage, the best member of the set is chosen based on actual usage patterns and prevailing link conditions.

Bandwidth efficiency may be increased by reducing the flooding of packets in L2 communication of messages transmitted between the hub and the remote terminals via the satellite within a satellite communication network.

Figure 2:
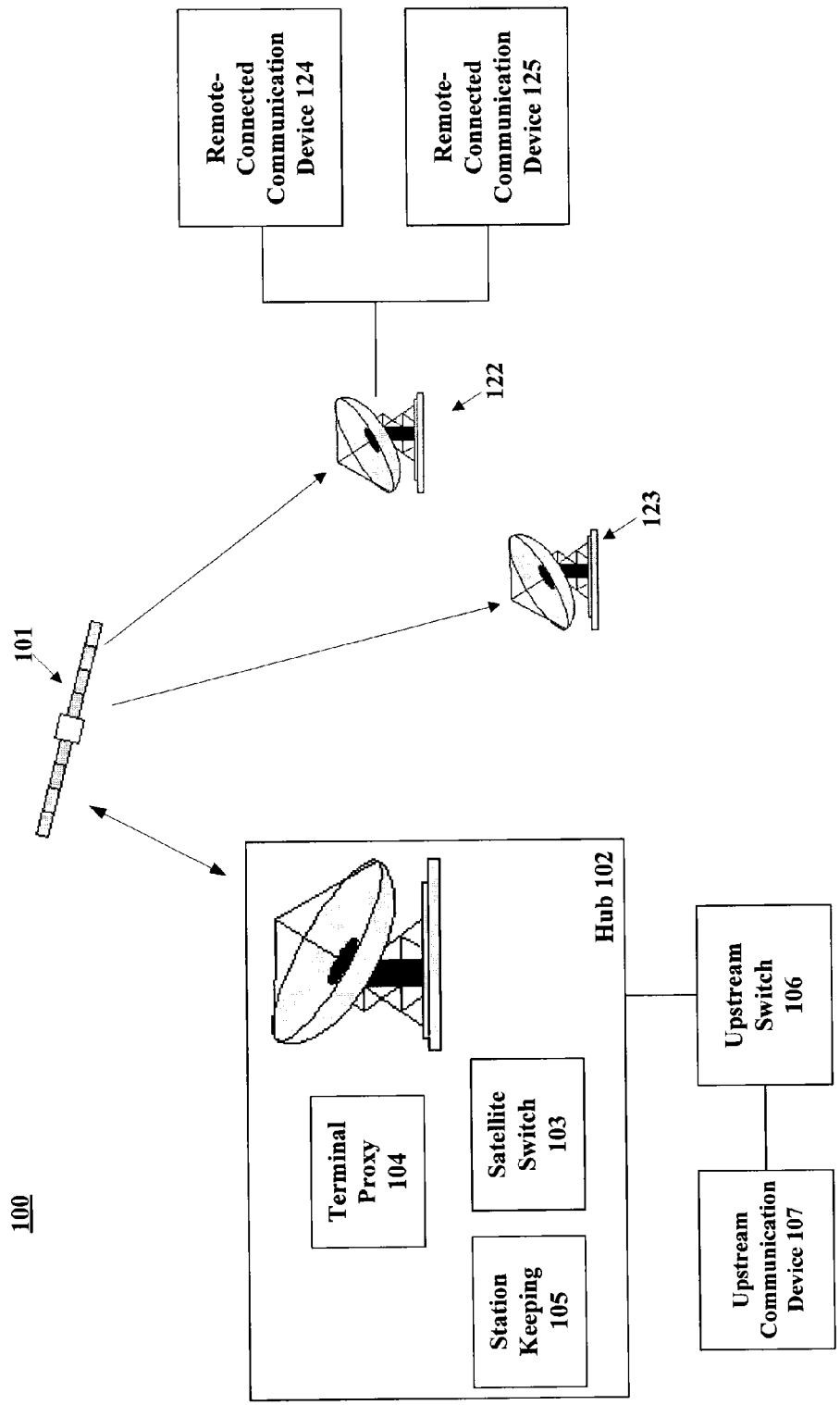
FIG. 2 illustrates an embodiment of a satellite network in accordance with the present invention.

FIG. 2 illustrates an exemplary implementation of a satellite network that employs a method of obtaining switch port information for switches in the satellite network without having to flood packets to determine port selection information for switches in the communication network. In this embodiment, one or more correspondence information carrying messages (e.g., an L2 Reply Message) may be sent across the satellite communication network from a remote terminal to the hub. Each correspondence information carrying message includes information that maps, or indicates a correspondence between (1) an L2 address of a downstream node (i.e., a MAC address of a computer or other remote-connected communication device connected to a particular remote terminal) and (2) a virtual network identifier that uniquely identifies a satellite virtual network (SVN) of which the corresponding remote-connected communication device is a member. An SVN defines an isolated namespace, and each SVN instance includes a private switching table. The remote terminal, terminal proxy software and satellite software switch can each handle multiple SVNs, which are delineated by any combination of VLAN tags, QinQ tags, or multiprotocol label switching (MPLS) labels.

VLAN tagging is defined in the IEEE 802.1Q standard. It is a networking standard that defines a method for inserting a special ID number in an Ethernet frame's header. Switches and routers may use this ID number in order to create virtual isolated broadcast domains that may be shared on a physical network.

QinQ tagging is an amendment to the VLAN standard, formally known as IEEE 802.1ad, and defines the ability to insert two VLAN ID numbers. This allows for easy "stacking" of ID numbers.

MPLS is a switching technology defined by RFC 3031. It is protocol independent and is used to send traffic across network nodes based on a short label instead of a network address, such as an IP address. The labels are used to describe an entire path between nodes instead of just a specific target. Along the path forwarding decisions can be made on this label without requiring any packet inspection.

Although in the embodiment described above, the correspondence information carrying message is sent from the remote terminal to the hub and includes correspondence information for remote connected devices, the invention also includes another embodiment in which the correspondence information carrying message is sent from the hub to a remote terminal and includes correspondence information for one or more upstream communication devices.

The embodiment in FIG. 2 illustrates satellite network 100 which includes satellite 101, hub 102 and a plurality of remote terminals including remote terminal 122 and remote terminal 123. While FIG. 2 illustrates remote terminals 122 and 123, one or more remote terminals may alternatively be provided within satellite network 100.

Hub 102 includes satellite switch 103, terminal proxy 104 and station keeping 105. FIG. 2 illustrates hub 102 as connected to upstream switch 106, but hub 102 may be connected to additional upstream switches of other communication devices. Throughout this disclosure, communication devices connected to upstream switch 106 may be referred to as upstream communication devices. Alternatively, the functionality of the upstream switch 106 may be incorporated into the hub 102.

Hub 102 may include a terminal proxy 104 for each remote terminal. Each terminal proxy 104 may correspond with a single remote terminal. For example, terminal proxy 104 may correspond to remote terminal 122. In one embodiment of the invention, the improvements that optimize communications between the devices connected to remote terminal 122 and hub 102 may be included entirely within the terminal proxy 104 and remote terminal 122. However, in other embodiments, the improvements may be distributed through additional components. Alternatively, all the improvements may be implemented within only the remote terminal 122 or only the hub 102.

Satellite switch 103 includes a plurality of physical and/or virtual ports each directed to a single remote terminal. Satellite switch 103 switches packets (i.e., selects an appropriate port for a packet) to be transmitted to and received from specific remote terminals. Each remote terminal may be assigned a terminal identifier (e.g., a specific radio frequency (RF) ID, an HDLC, etc.) that is known by hub 102. High-level data link control (HDLC) is defined in ISO 13239 and defines a method for connecting point to multi-point connection or one device to another via synchronous or asynchronous links. Additionally, each remote terminal may know its assigned terminal identifier. A terminal identifier may be used for physical layer communication between the hub 102 and the remote terminal 122. Satellite switch 103 may forward packets to and receive packets from a terminal proxy 104 corresponding to a particular remote terminal using the terminal identifier and depending upon a correspondence between a MAC address and an SVN identifier.

The satellite switch 103 and terminal proxy 104 may communicate with each other using any convenient inter-process communication (IPC) method. In point to multi-point connections, each remote terminal may be assigned a specific terminal identifier (e.g., a radio-frequency (RF) ID or HDLC address), allowing hub 102 to simultaneously address connections to multiple remote terminals over satellite network 101.

Upstream switch 106 is connected to hub 102 or may be incorporated in hub 102. Upstream switch 106 may be any standard L2 Ethernet managed switch. For example, upstream switch 106 may be an L2 Ethernet managed switch compliant with IEEE 802 protocol. Communication between upstream switch 106 and satellite switch 103 may comply with IEEE 802 protocol.

Station keeping 105 may perform control functions of hub 102 other than switching and communication with remote terminals via satellite 101 in order to keep remote terminals healthy and functioning properly. In an exemplary embodiment, station keeping 105 may prompt remote terminals to acquire and stay in a network. Station keeping 105 may allocate bandwidth and manage local and satellite traffic.

Upstream switch 106 may be connected to upstream communication device 107. However, upstream switch 106 may be connected to one or more upstream communication devices. In other exemplary implementations, upstream communication device 107 may be directly connected to hub 102. Upstream communication device 107 may be connected to upstream switch 106 or hub 102 through a local area network (LAN). Upstream switch 106 may also be connected to a wide area network such as the internet.

Examples of upstream communication devices may include computers, printers, servers, digital displays, personal digital assistances, phones, or any other network-communication enabled device.

Remote terminals 122 and 123 are each an RF-enabled device that communicates via a radio frequency (RF) carrier with the satellite and also communicates with remote-connected communication devices (e.g., computers, switches, etc. . . . ) via an included Ethernet port. From here on, discussion relating to remote terminals may relate to remote terminal 122, however, the discussion may also apply to remote terminal 123. Remote terminal 122 may communicate with hub 102 via satellite 101. Remote terminal 122 may perform L2 switching for an Ethernet based network including remote-connected communication devices 124 and 125. Remote terminal 122 may transmit packets to and from remote-connected communication devices 124 and 125 to upstream communication device 107 via satellite 101.

Remote-connected communication devices 124 and 125 may be connected to remote terminal 122 via a LAN or may be connected to remote terminal 122. Remote terminal 122 may also be connected to a wide area network or the internet. Examples of remote-connected communication devices may include computers, printers, servers, digital displays, personal digital assistances, phones, or any other network-communication enabled device.

Upstream communication device 107 may communicate with remote-connected communication device 124 via satellite network 100. In a background L2 communication, when a switch encounters a packet with a destination MAC address that the switch does not recognize, the switch may flood the packet to all switch ports, except the originating switch port, until the switch learns a specific path to the host destination.

According to another conventional method, when a communication device is acquired into a satellite network, the hub side switch may not know to which remote terminal the communication device is connected. Therefore, according to that conventional method, when the hub side switch needs to send a message to such a newly acquired communication device, it does not know which remote terminal to send the packet to. Accordingly, the conventional method may broadcast (i.e., flood) the message (e.g., a packet) to all available remote terminals to make sure that message reaches the intended communication device. And, according to that conventional method, when a response is received from the communication device, the hub side switch is able to add MAC address correspondence information indicating the relationship between a MAC address of the communication device and a remote terminal to which it is connected, to a FIB table to be used to select a remote terminal identifier for subsequent messages to the communication device.

A satellite network 100 according to an embodiment of the invention may advantageously reduce the need for satellite switch 103 to flood packets via satellite 101 for the purpose discussed above. According to one embodiment, a correspondence information carrying message is transmitted from a remote terminal 122 to hub 102 that includes correspondence information entries. Each correspondence information entry relates a virtual network identifier to a MAC address for a communication device, i.e., remote-connected communication devices 124 and 125, that is a member of the virtual network. Each correspondence information carrying message includes one or more, or at least two correspondence information entries.

Each remote terminal may receive and store configuration information informing the remote terminal to which one or more virtual networks the remote terminal belongs. The hub 102 and/or the satellite switch 103 may also receive and store this configuration information. The configuration information may be distributed to remote terminal 122, hub 102 and satellite switch 103 by an administrative action (e.g., installation) or via a configuration message. The configuration information may be distributed at different times and via different methods to each recipient.

After receiving the correspondence information carrying message, terminal proxy 104 in hub 102 may then transmit individual device identification messages, commonly referred to as address resolution protocol (ARP) probe messages, to upstream switch 103 and 106 and/or upstream communication device 107. These device identification messages advertise the MAC addresses and corresponding virtual network identifiers received in the correspondence information carrying message received from remote terminal 122. If a device identification message is transmitted to upstream switch 106, upstream switch 106 may transmit a device identification message upstream to upstream communication device 107. As a result, upstream communication device 107 may communicate with remote-connected communication devices 124 and/or 125, using the MAC address and corresponding virtual network information obtained from the device identification messages, without having to flood packets over the satellite network. Such functionality and benefits of satellite network 100 are further explained below in connection with FIGS. 3-6(b).

FIG. 3 illustrates exemplary communication between hub 102 and remote terminals 122 and 123 via satellite 101.

When a link is established between hub 102 and a particular remote terminal via satellite 101 (e.g., when the remote terminal is acquired into satellite network 100, for example after initialization, after recovering from a failure, after a weather related drop out, etc. . . . ), hub 102 may communicate with the particular remote terminal via satellite 101 by transmitting messages using a unique terminal identifier (e.g., RF ID, HDLC, etc. . . . ) of the intended remote terminal recipient. Satellite 101 transmits an RF signal that repeats the transmitted communication to all connected remote terminals. In the example illustrated in FIG. 3, hub 102 transmits message A at terminal identifier AA to satellite 101. Satellite 101 repeats message A at terminal identifier AA to remote terminals 122 and 123.

As previously described, remote terminals 122 and 123 may each be assigned a unique terminal identifier that is known by hub 102. These terminal identifiers are specific and unique to each remote terminal. In other words, the terminal identifier assigned to remote terminal 122 is different than the terminal identifier assigned to remote terminal 123. In other implementations, there may also be a broadcast terminal identifier recognized by all remote terminals and used for broadcast messages. When addressing a communication to multiple remote terminals, hub 102 may transmit a communication to the remote terminals via satellite 101 using the broadcast terminal identifier, which may be understood and processed by multiple remote terminals.

In the example illustrated in FIG. 3, a terminal identifier AA may be assigned to remote terminal 122 and a different terminal identifier, for example a terminal identifier BB, may be assigned to remote terminal 123. The hub 102 may then create a message A directed to terminal identifier AA, and message A is received and processed by remote terminal 122. While remote terminal 123 also receives message A, remote terminal 123 is not assigned terminal identifier AA. As a result, remote terminal 123 is either unable to, or configured not to, recognize and process message response to message A, remote terminal 122 transmits message B to hub 102. Message B may not be transmitted to remote terminal 123 or any other remote terminal.

Figure 4A:
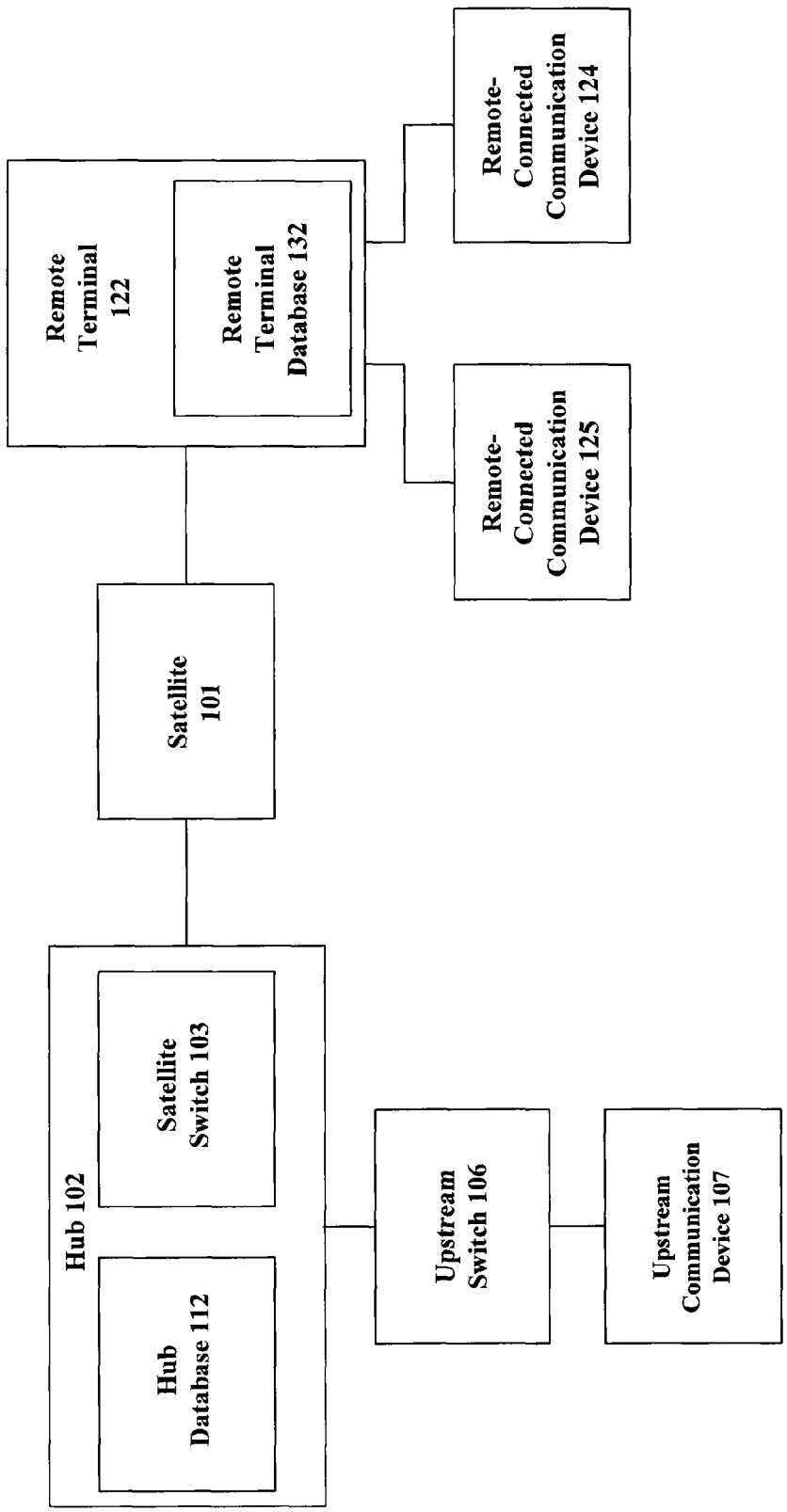
FIG. 4(a) illustrates exemplary components including a single remote-terminal within a satellite network.
Figure 4B:
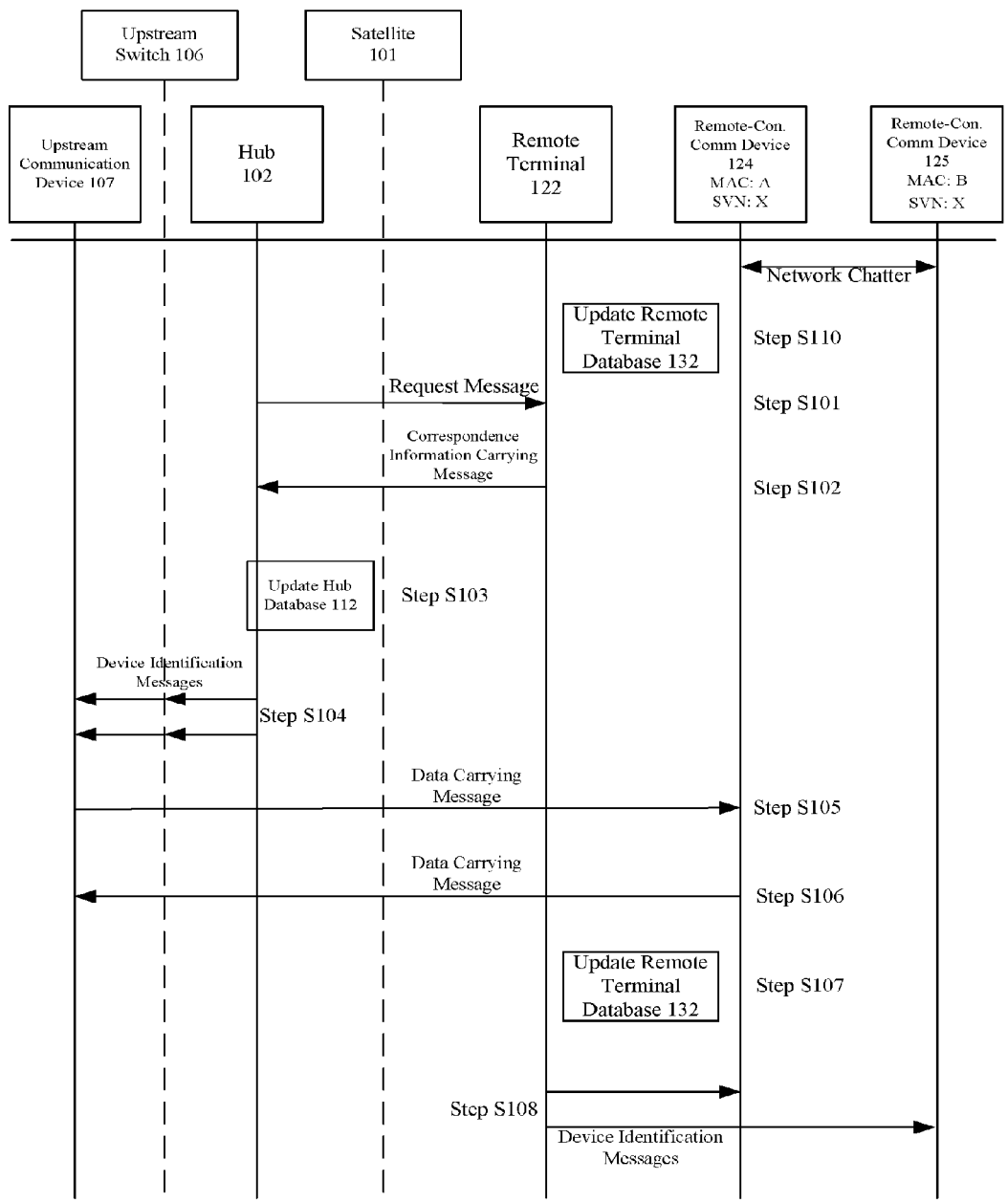
FIG. 4(b) illustrates an embodiment of a process of device communication and address distribution within a satellite network including the exemplary components of FIG. 4(a).

FIG. 4(a) illustrates exemplary components of satellite network 100 that perform satellite communication in accordance with the steps illustrated in FIG. 4(b). FIG. 4(b) illustrates a process of performing L2 communication between devices within a single SVN without having to flood packets over satellite network 100.

As illustrated in FIG. 4(a), hub 102 may communicate with upstream switch 106 and communication device 107. Hub 102 may transmit messages to remote terminal 122 via satellite 101. Remote terminal 122 may communicate with remote-connected communication devices 124 and 125. In the example of FIGS. 4(a) and 4(b), remote-connected communication device 124 may be assigned MAC address A and remote-connected communication device 125 may be assigned MAC address B and both remote-corrected communication devices 124 and 125 may be assigned to SVN X. In this example, Remote Terminal 122 may include an L2 switch capability. Alternatively, a remote-connected L2 switch may be connected to the remoter terminal and to one or more of the remote-connected communication devices connected to remote terminal 122.

The communication process illustrated in FIG. 4(b) may begin at step S101. In step S101, hub 102 transmits a request message (e.g., an L2 request message) via satellite 101 to remote terminal 122. A request message may be a control message that may be generated and transmitted by terminal proxy 104 on behalf of satellite switch 103. The request message transmitted by hub 102 may request that the addressed remote terminal transmit back to hub 102 an L2 reply message including correspondence information entries for some, or all, MAC addresses of other communication devices currently known to the remote terminal.

The request message may be a short message include placeholder bits and request bits. An exemplary request message, L2RequestMessage, may be defined as in Table 1.

TABLE 1

Request Message Format

| L2RequestMsgID (1480) | # bits | |
|---|---|---|
| m_placeholder | 8 | Unused |
| m_l2_type | 8 | L2_SEND_MAC_TABLE (only option right now) |

Remote terminal 122 may be designed to understand a received request message.

Step S101 may be performed by hub 102 in response to a link being established with remote terminal 122. A link between hub 102 and remote terminal 122 may be established when remote terminal 122 is connected to satellite network 100, disruptions in the communication are resolved, or when hub 102 is restarted. Disruptions in communication may include adverse atmospheric conditions, power failures at any component of satellite network 100, component restarts, or other disruptive events. Hub 102 may detect when a link is established with remote terminal 122. Alternatively, remote terminal 122 may transmit a connection message to hub 102 to identify that a link to remote terminal 122 has been established, even in the absence of receiving a request message.

Upon reception of the request message, remote terminal 122 may transmit a correspondence information carrying message to hub 102 in step S102. A correspondence information carrying message is a controlmessage that may be transmitted by remote terminal 122 to terminal proxy 104 of hub 102. The correspondence information carrying message may be transmitted by remote terminal 122 to hub 102 in response to remote terminal 122 receiving a request message as in step S101.

In other embodiments, the process illustrated in FIG. 4(*b*) may begin at step S102. In other words, remote terminal 122 may transmit a correspondence information carrying message to hub 102 without reception or transmission of the request message. In such implementations, the correspondence information carrying message may be transmitted by remote terminal to hub 102 when a link is established between hub 102 and remote terminal 122, after a predetermined period of time, or after another predetermined event.

The correspondence information carrying message may have a compact message structure to allow for transmission of the known mac addresses in a single transmission. The correspondence information carrying message may allow for bandwidth savings over standard packet flooding that is typically performed in Ethernet messaging.

The correspondence information carrying message transmitted by remote terminal 122 may contain correspondence information entries of known MAC addresses of devices connected to remote terminal 122 and their respective virtual network identifiers. The correspondence information carrying message may include a MAC address and a corresponding SVN identifier for each known device, or a subset of known devices, that can communicate with the remote terminal 122.

If remote terminal 122 does not know any MAC addresses, the correspondence information carrying message may include an identifier that indicates that no MAC addresses are known. According to an alternative embodiment, the remote terminal 122 may send no correspondence information carrying message when it does not know any MAC addresses. Such an identifier may simply be "0," or alternatively, the identifier may be another indication known by hub 102. In other implementations, the correspondence information carrying message may also identify a number of known mac addresses that are included in the correspondence information carrying message.

An exemplary correspondence information carrying message, L2ResponseMsgID, may be formatted as shown in Table 2.

TABLE 2

Correspondence information carrying message Format

| L2ResponseMsgID (1481) | # bits | |
| --- | --- | --- |
| m_entries_in_this_message | 8 | Number of table entries (160 max) |
| m_ret_code | 8 | ACK (only option right now) |
| L2MacTable.m_svn_id | 32 | SVN ID for entry N. |
| L2MacTable.m_mac_addr[6] | 48 | MAC Address for entry N. |

Additionally, the correspondence information carrying message may include a return code to acknowledge the request message transmitted from hub 102. Alternatively, the return code field may convey other information to hub 102 (e.g., alert hub 102 or operators of satellite network 100 of a configuration or communication error condition). In exemplary implementations, each SVN identifier is 32 bits, each MAC address entry is 48 bits, each return code is 8 bits, and the number of entries in the message is 8 bits, although other sizes are also included in the invention. However, correspondence information carrying messages may include other information and correspond to a different data structure.

To generate a correspondence information carrying message for transmission to hub 102, remote terminal 122 may access MAC addresses and SVN identifiers stored in a remote-terminal database 132 or other data structure used by the remote terminal to store MAC address correspondence information. An embodiment of a remote-terminal database 132 is illustrated in FIG. 6(*a*).

Remote-terminal database 132 is a database that is managed by remote terminal 122, as illustrated in step S110 in FIG. 4(*b*). Remote-terminal database 132 may store MAC addresses of known devices, and corresponding SVN identifiers of the known devices. The database 132 may also include a connection type between remote terminal 122 and the known device. The connection type may indicate whether the known device is connected via the local LAN (e.g., Ethernet) or via the satellite network (e.g., via RF connection). The connection type information may be used for administrative and or debugging purposes.

Remote terminal 122 may perform step S110 in the process illustrated in FIG. 4(*b*) by storing MAC addresses and corresponding SVN identifiers of remote-connected communication devices within remote-terminal database 132. Remote terminal 122 may also store in remote-terminal database 132 a known connection type between remote terminal 122 and the connected device. As a result, remote terminal 122 may store a correspondence between a connection type between remote terminal 122 and the connected device and the MAC address of the connected device.

Step S110 may be performed continuously, with or without a link between hub 102 and remote terminal 122. In an exemplary implementation, remote terminal 122 may periodically or continuously perform step S110 in its background processing, to listen for, or monitor, communications and to learn MAC addresses and SVN identifiers of connected devices (i.e., devices that communicate via a network that the remote terminal is able to monitor), and upon learning a new MAC address and/or SVN identifier of a connected device, to store the learned MAC address and/or SVN identifier within remote-terminal database 132. In other words, remote terminal 122 may perform step S110 before or after receipt of a request message from hub 102 as well as before or after transmission of a correspondence information carrying message to hub 102. In other implementations, remote terminal 122 may periodically perform step S110 at predetermined time intervals or upon detection of other predetermined events.

In the example illustrated in FIGS. 4(*a*) and 4(*b*), the MAC addresses A and B and SVN identifier X for remote-connected communication devices 124 and 125 are stored in remote-terminal database 132.

Returning to the discussion of the correspondence information carrying message transmitted by remote terminal 122 in step S102, in order to transmit a correspondence information carrying message, remote terminal 122 may first generate the correspondence information carrying message. Remote terminal 122 copies the MAC addresses and corresponding SVN identifiers stored within remote-terminal database 132 into the correspondence information carrying message. In the example illustrated in FIGS. 4(*a*) and 4(*b*), the correspondence information carrying message transmitted to hub 102 in step S102 includes MAC address A and MAC address B as well as SVN identifier X for remote-connected communication devices 124 and 125.

After reception of the correspondence information carrying message, in step S103, hub 102 stores the MAC addresses and corresponding SVN identifiers included in the received correspondence information carrying message within hub database 112.

Figure 5A:
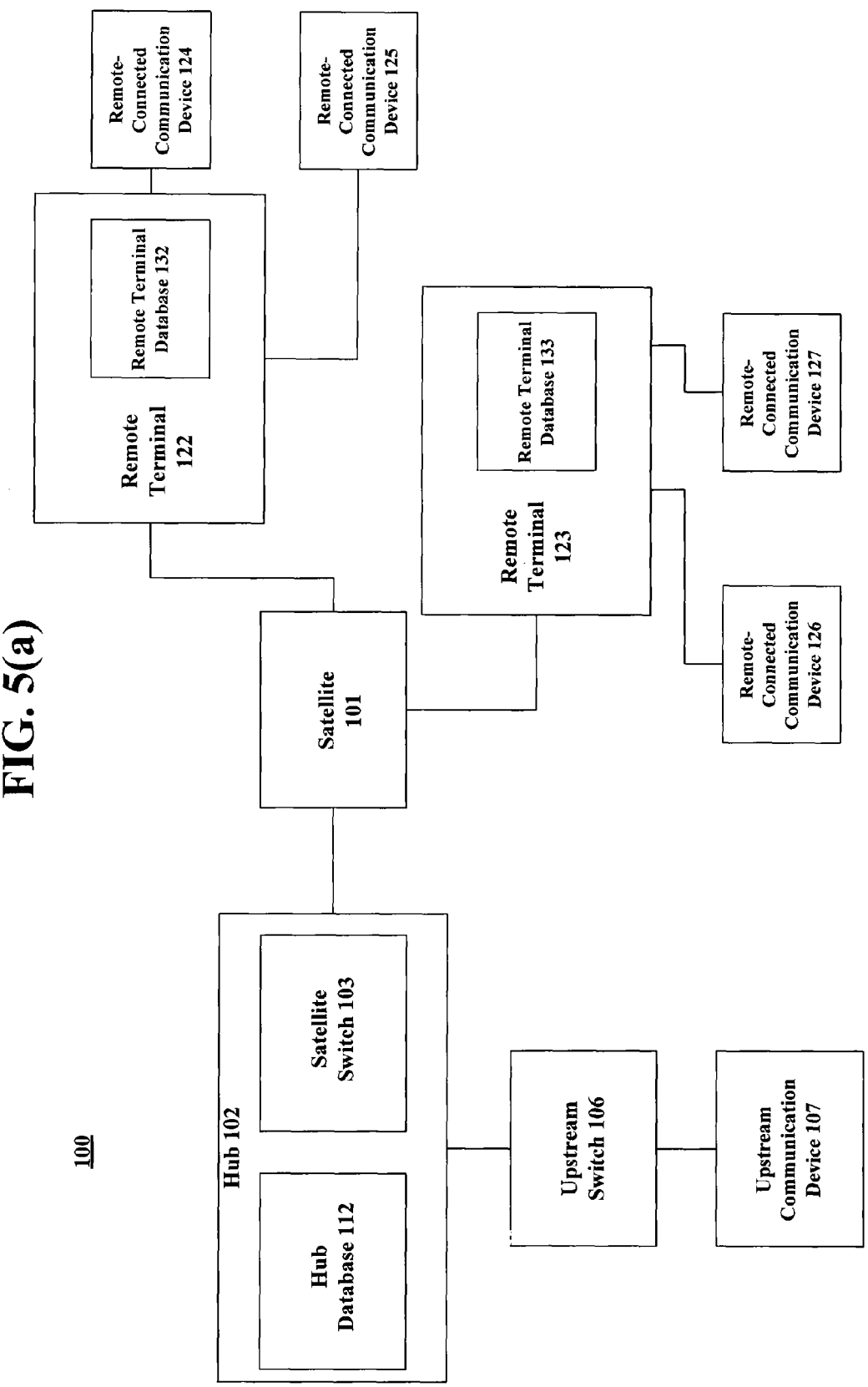
FIG. 5(a) illustrates exemplary components including two remote-terminals within a satellite network.
Figure 5B:
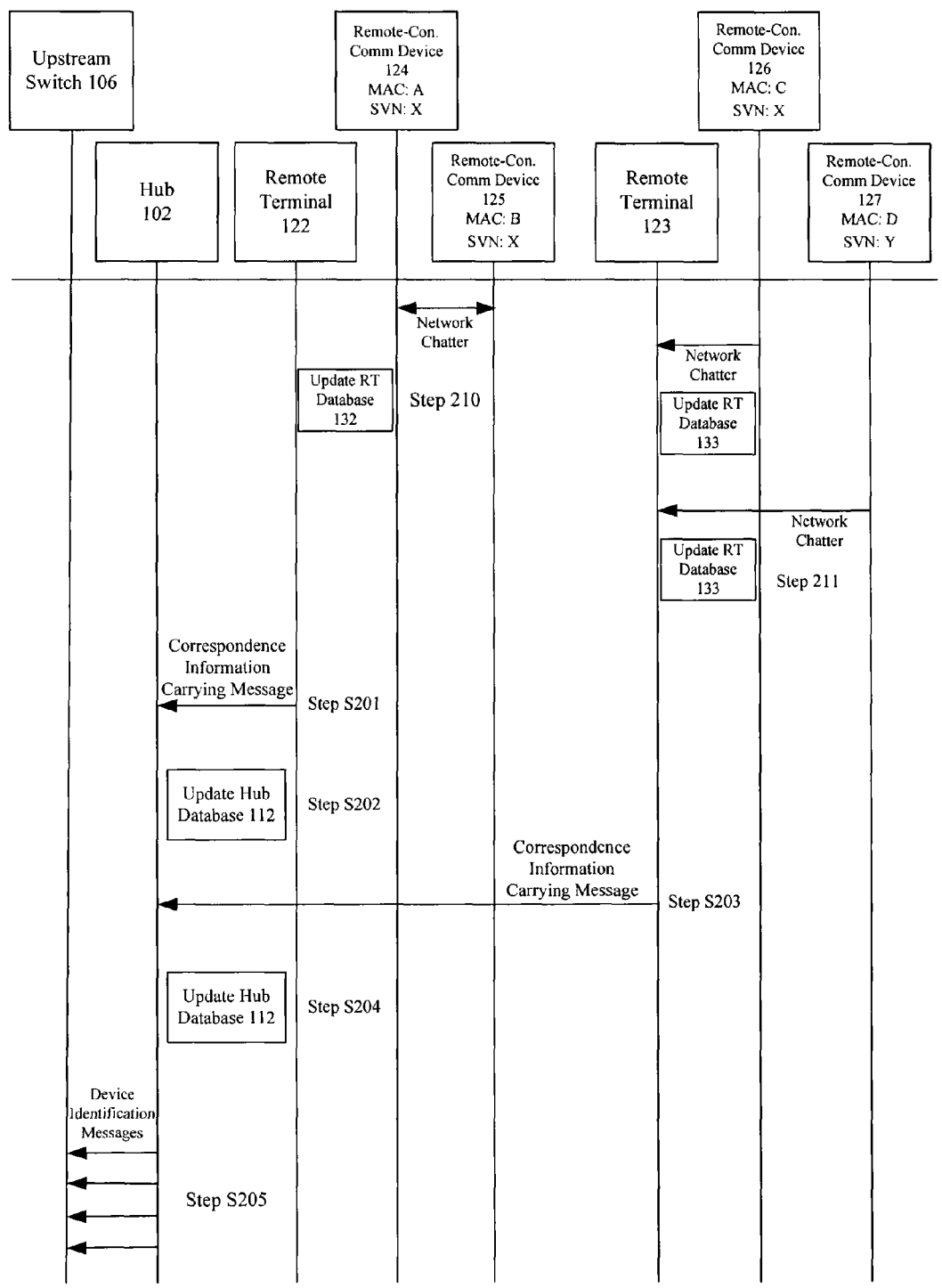
FIG. 5(b) illustrates an embodiment of a process of device communication and address distribution within a satellite network including the exemplary components of FIG. 5(a).

Hub database 112 is illustrated in FIG. 5(b). Hub database 112 is a database managed by hub 102. Satellite switch 103 may maintain this database. The upstream switch keeps a FIB of MAC addresses and virtual network IDs to a single satellite switch 103, out of plural possible satellite switches.

Hub 102 stores MAC addresses and SVN identifiers received from the correspondence information carrying message in hub database 112. Hub 102 also stores in hub database 112 the assigned terminal identifier of remote terminal 122. Hub 102 stores, for each MAC address learned from the correspondence information carrying message, the MAC address, the corresponding SVN identifier and the terminal identifier for remote terminal 122. As a result, hub 102 may store a relation between a terminal identifier and the learned MAC addresses and SVN identifiers of remote-connected communication devices 124 and 125.

When transmitting a packet from an upstream communication device, hub 102 may see the packet and refer to hub database 112. Because hub database 112 stores a relation between a terminal identifier and the MAC addresses and SVN identifiers for remote-connected communication devices, hub 102 may refer to hub database 112 and forward the packet to an appropriate terminal proxy 104 for transmission to the remote terminal via satellite 101.

Because multiple remote terminals may be linked to hub 102, hub 102 may receive correspondence information carrying messages from more than one remote terminal. For example, as illustrated in hub database 112 in FIG. 6(b), a remote-connected communication device with MAC address 1 and SVN 11 is connected to a remote terminal with terminal identifier 1, while a remote-connected communication device with MAC address 5 and SVN 12 is connected to a remote terminal with terminal identifier 2. As a result, hub 102 may identify a specific location of a remote-connected device by the correspondence between the assigned terminal identifier of a remote terminal and the MAC addresses learned from the correspondence information carrying message received from the remote terminal.

Hub 102 may also identify remote-connected communication devices behind a specific remote terminal by the SVN configuration information and the correspondence information (i.e., the mapping between MAC addresses of the communication devices to SVNs) learned from the correspondence information carrying message sent by the remote terminal. Alternatively, hub 102 may identify the remote-connected communication devices behind a specific remote terminal from only the correspondence information carrying message, which is part of a frame that includes an identifier of the remote terminal that sent the correspondence information carrying message, and which also includes the correspondence information (i.e., the mapping between MAC addresses of the communication devices to SVNs) for communication devices connected to the remote terminal.

After storing MAC addresses and SVN identifiers in hub database 112 in step S103, hub 102 may proceed to step S104. In step S104, hub 102 may transmit individual device identification messages to upstream switch 106 and/or upstream communication devices 107.

A device identification message may be any L2 message that is standards compliant as defined in RFC 5227. The device identification message (e.g., ARP probe) may identify a correspondence between a MAC address of a device and an assigned SVN identifier for a remote terminal in the satellite network. And, that message is used by the hub software switch and/or the upstream switch to build their FIB tables. After reception of the device identification message, a recipient device may learn the MAC address and SVN identifier so that in the future, the recipient device may transmit a message to the learned MAC address utilizing the MAC address and the SVN identifier.

In step S104, hub 102 transmits a device identification message to each upstream communication device for each MAC address that is stored in hub database 112. In the implementation illustrated in FIG. 4(b), hub 102 transmits a device identification message to upstream switch 106 for each MAC address stored in hub database 112. Upstream switch 106 then transmits a device identification to upstream communication device 107 for device identification message received from hub 102. In other implementations, hub 102 may transmit device identification messages directly to upstream communication device 107, or hub 102 may transmit a device identification message to each upstream communication device for each MAC address that is newly added to hub database 112 in step S103.

In the example illustrated in FIGS. 4(a) and 4(b), hub 102 transmits a device identification message to upstream switch 106 that includes MAC address A. Hub 102 also transmits a device identification message to upstream switch 106 that includes MAC address B. Both device identification messages also include the SVN identifier X. Upstream switch 106 in turn transmits device identification messages to upstream communication device 107. When additional upstream communication devices are present, upstream switch 106 would transmit individual device identification messages to each upstream communication device for each device identification message received from hub 102. In other implementations, upstream switch 106 may transmit device identification messages to other upstream connected communication devices.

After transmission of device identification messages in step S104, upstream communication devices will have learned the MAC addresses and associated SVN identifiers of remote-connected communication devices 124 and 125. The process illustrated in FIG. 4(b) then proceeds to step S105.

In step S105, upstream communication device 107 transmits a message to remote-connected communication device 124. Upstream communication device 107 may transmit a message to remote-connected communication device 124 because upstream communication device 107 learned the MAC address and SVN identifier of remote-connected communication device 124 in step S104.

In exemplary implementations, the message transmitted in step S105 may include MAC address A of remote-connected communication device 124 as a destination MAC address. The message may also contain SVN identifier X. The transmitted message may include a MAC address of upstream communication device 107 as a source MAC address. Additionally, the message transmitted in step S105 may include other information that may be communicated between upstream communication device 107 and remote-connected communication device 124.

In particular, upstream communication device 107 may transmit the message to hub 102 for transmission to remote-connected communication device 124. Upstream switch 106 transmits the message to hub 102 and based on correspondence information entry in the correspondence information carrying message and stored in hub database 112, and hub 102 transmits the message to remote terminal 122 via satellite 101.

In other implementations, hub 102 may compare MAC address A and/or SVN identifier X included as the destination address in the message with MAC addresses and SVN identifiers stored in hub database 112 to determine which remote terminal the message should be forwarded to. Hub 102 may use the correspondence between the RF address and the MAC address and SVN identifier stored in hub database 112 to make this determination.

After reception by remote terminal 122, remote terminal 122 forwards the message to remote-connected communication device 124. Remote terminal 122 may use the correspondence between an Ethernet connection of remote-connected communication device 124 and the MAC address and SVN identifier stored in remote-terminal database 132 to make this determination in order to forward the message to remote-connected communication device 124.

After reception of the message, remote-connected communication device 124 may communicate with upstream communication device 107, as illustrated in FIG. 4(b) in step S106. In step S106, remote-connected communication device 124 may communicate with upstream communication device 107 because the received message received by remote-connected communication device 124 included the MAC address of upstream communication device 107 as the source MAC address. In other words, in step S106, remote-connected communication device 124 may transmit a message to upstream communication device 107.

In exemplary implementations, the process may further include steps S107 and S108.

In step S107, after reception of the message, remote terminal 122 may store the MAC address of upstream communication device 107 in remote-terminal database 132. In step S108, remote terminal 122 may transmit device identification messages to remote-connected communication devices 124 and 125, the device identification messages including the MAC address and SVN identifier of upstream communication device 107.

After such transmissions, remote-connected communication devices 124 and 125 may communicate with upstream communication device 107 because they have been informed of the MAC address and SVN identifier of upstream communication device 107. In other words, steps S107 and S108 minimize the need for remote-connected communication devices to flood packets within satellite network 100 in search of upstream communication device 107.

FIGS. 5(a) and 5(b) illustrate exemplary components and processes of performing L2 communication between devices within multiple SVNs without, or with reduced, packet flooding over satellite network 100.

As illustrated in FIG. 5(a), remote-connected communication devices 124 and 125 are connected to remote terminal 122 and remote-connected communication devices 126 and 127 are connected to remote terminal 123. In the implementation illustrated in FIGS. 5(a) and 5(b), remote-connected communication device 124 is assigned MAC address A, remote-connected communication device 125 is assigned MAC address B, remote-connected communication device 126 is assigned MAC address C, remote-connected communication device 127 is assigned MAC address D, remote-connected communication devices 124-126 are assigned SNV identifier X, and remote-connected communication device 127 is assigned SVN identifier Y.

As illustrated in FIG. 5(b), remote terminals 122 and 123 may listen for network chatter and update their remote terminal databases to store MAC addresses of known devices, corresponding SVN identifiers of the known devices, as well as a connection type between the remote terminal and the known device. In step 210, remote terminal 122 stores mac addresses and SVN identifiers of remote-connected communication devices 124 and 125 within remote-terminal database 132. In step 211, remote terminal 123 stores MAC addresses and SVN identifiers of remote-connected communication devices 126 and 127 within remote-terminal database 133.

In step S201, remote terminal 122 enters the network and transfers a correspondence information carrying message to hub 102. In other implementations, remote terminal 122 may receive a request message from hub 102. In step 202, hub 102 stores the correspondence information entries from the request message transferred from remote terminal 122 in hub database 112.

Like remote terminal 122, in step S203, remote terminal 123 enters the network and transfers a correspondence information carrying message to hub 102. In other implementations, remote terminal 123 may receive a request message from hub 102. In step 204, hub 102 stores the correspondence information entries from the request message transferred from remote terminal 123 in hub database 112.

Finally, in step S205, hub 102 may transmit individual device identification messages to upstream switch 106. As described with respect FIGS. 4(a) and 4(b), upstream switch 106 may then transmit each device identification message to upstream communication device 107. While FIG. 5(b) illustrates a single step S205 for transmitting individual device identification messages to upstream switch 106, step S205 may be performed intermittently or all at once. For example, individual device identification messages may be transmitted to upstream switch 106 after step S202 and then individual device identification messages may be transmitted to upstream switch 106 after step S204.

In the implementation illustrated in FIGS. 5(a) and 5(b), multiple SVN identifiers were utilized. In particular, remote-connected communication devices 124 and 125 connected to remote terminal 122 and remote-connected communication device 126 connected to remote terminal 123 are assigned SVN X. In contrast, remote-connected communication device 127 connected to remote terminal 123 is assigned SVN Y. The device identification messages transmitted by hub 102 to upstream switch 106 in step S205 identify the particular SVN identifier corresponding to the transmitted MAC address.

Embodiments of the invention described herein may provide several benefits over conventional L2 messaging systems. The embodiments include a method for switching software on the terminal to continue to discover and store MAC addresses even when the satellite link is down. The terminal may then transmit the switching information in an optimized message, the correspondence information carrying message, (e.g., an L2ResponseMessage) upon joining the network. The embodiments also include a compact message structure to allow for communication of the necessary FIB information which allows for greater than 100 to 1 bandwidth savings over standard Ethernet messaging. The inventive method may advantageously avoid any over the air flooding for discovery upon link reestablishment, and may save bandwidth and improve convergence time. Also, upon receipt of these optimized compact messages, hub side processes may take the received address mapping information to compose as many ARP probes as are required to teach the upstream switch or switches the same switching information in a formal L2 standards-compliant manner.

The embodiments also include a method to regenerate and send ARP probes to the upstream switch upon recognizing a link failure and recovery, as well as a method whereby when satellite switching software restarts (for example after a failure) it will request forwarding information from all terminals to rebuild its FIB table. Therefore a communication system according to the invention may avoid flooding even under failure conditions.

Figure 7:
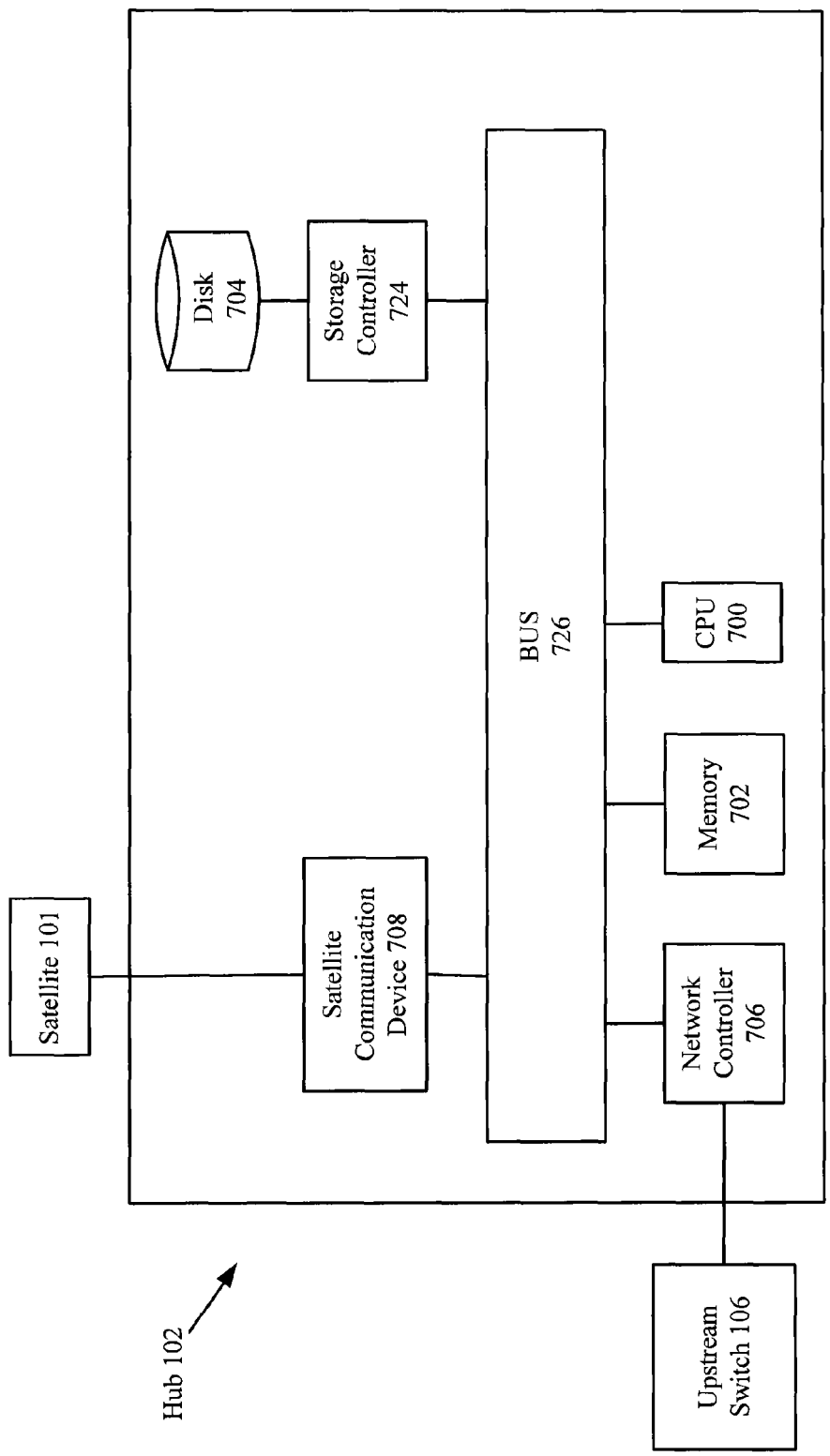
FIG. 7 illustrates exemplary components of a hub in accordance with the present invention.

Next, a hardware description of hub 102 according to an exemplary implementation is described with reference to FIG. 7. In FIG. 7, hub 102 includes CPU 700 which performs the processes of hub 102 as above. The process data and instructions may be stored in memory 702. These processes and instructions may also be stored on a storage medium disk 704 such as a hard drive (HDD) or portable storage medium or may be stored remotely, hub database 112 may be stored within memory 702 or storage medium disk 704.

Further, such processes and process data are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the hub 102 communicates, such as a server or computer. The processes of terminal proxy 104, station keeping 105 and satellite switch 103 may be controlled or executed by CPU 700.

Further, the functionality may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

Hub 102 in FIG. 7 also includes a network controller 706, such as an Intel Ethernet PRO network interface card from Intel Corporation of America, for interfacing with upstream communication devices or other hub-connected devices, such as upstream switch 106. Network controller 706 may connected to a public network, such as the Internet, or a private network such as an LAN or WAN network, or any combination thereof and can also include PSTN or ISDN sub-networks. Network controller 706 may connect to hub-connected devices via wired connection, as an Ethernet, or via a wireless connection through forms of data communication such as cellular networks including EDGE, 3G and 4G wireless cellular systems, or WiFi, Bluetooth, or any other wireless form of communication.

Hub 102 further includes a satellite communication device 708, for transmitting and receiving signals to and from satellite 101 for communication with remote terminals.

The general purpose storage controller 724 connects the storage medium disk 704 with communication bus 726, which may be an ISA, EISA, VESA, PCI, or similar, for interconnecting all of the components of the hub 102.

Figure 8:
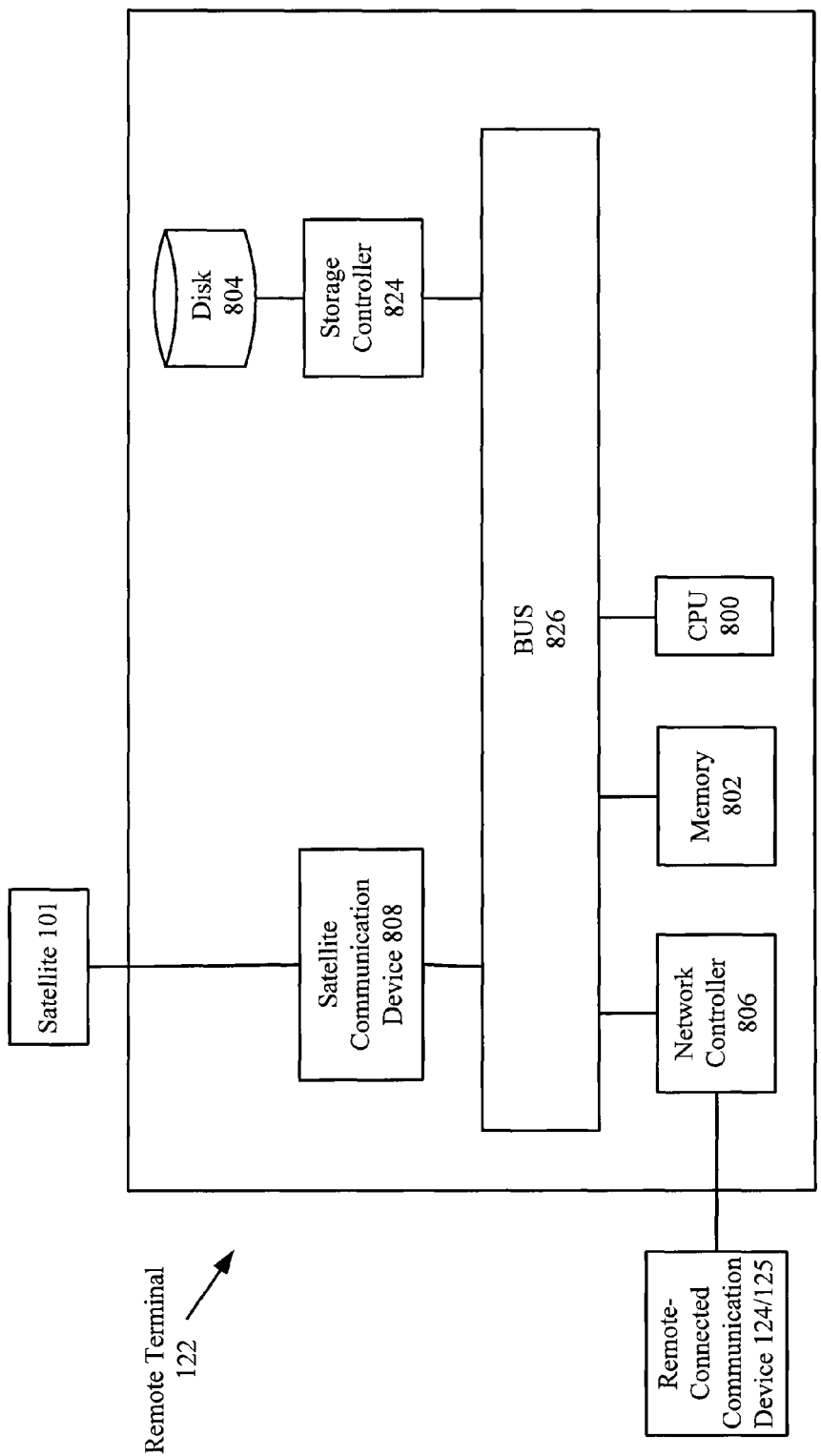
FIG. 8 illustrates exemplary components of a remote terminal in accordance with the present invention.

A hardware description of a remote terminal such as remote terminal 122 according to an exemplary implementation is described with reference to FIG. 8. In FIG. 8, remote terminal 122 includes a CPU 800 which performs the processes of remote terminal 122 as above. The process data and instructions may be stored in memory 802. These processes and instructions may also be stored on a storage medium disk 804 such as a hard drive (HDD) or portable storage medium or may be stored remotely. Remote-terminal database 132 may be stored within memory 802 or storage medium disk 804. Further, such processes and process data are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which remote terminal 122 communicates, such as a server or computer.

Further, the functionality may be provided as a utility application, background daemon, or component of an operating system, or combination thereof, executing in conjunction with CPU 800 and an operating system such as Microsoft Windows 7, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

Remote terminal 122 in FIG. 8 also includes a network controller 806, such as an Intel Ethernet PRO network interface card from Intel Corporation of America, for interfacing with remote-connected communication devices or other remote-connected devices. Network controller 806 may connected to a public network, such as the Internet, or a private network such as an LAN or WAN network, or any combination thereof and can also include PSTN or ISDN sub-networks. Network controller 806 may connect to remote-connected communication devices via wired connection, as an Ethernet, or via a wireless connection through forms of data communication such as cellular networks including EDGE, 3G and 4G wireless cellular systems, or WiFi, Bluetooth, or any other wireless form of communication.

Remote terminal 122 further includes a satellite communication device 808, for transmitting and receiving signals to and from satellite 101 for communication with hub 102.

The general purpose storage controller 824 connects the storage medium disk 804 with communication bus 826, which may be an ISA, EISA, VESA, PCI, or similar, for interconnecting all of the components of the remote terminal 122.

Numerous modifications and variations of the present advancements are possible in light of the above teachings. It is therefore to be understood that within the scope of the appended claims, the advancements may be practiced otherwise than as specifically described herein.

The invention claimed is:

1. A method of communication in a satellite network including a hub, a satellite, a remote terminal, an upstream switch connected to the hub, at least one upstream communication device connected to the upstream switch, and plural remote-connected communication devices connected to the remote terminal, the method comprising:
   copying, by the remote terminal, a particular correspondence information entry from a remote-terminal database to a correspondence information carrying message;
   receiving at the hub, via the satellite from the remote terminal after the remote terminal copies the particular correspondence information entry, the correspondence information carrying message including plural correspondence information entries, the plural correspondence information entries including the particular correspondence information entry and each correspondence information entry of the plural correspondence information entries identifying a virtual network identifier associated with a media access control (MAC) address of one of the plural remote-connected communication devices connected to the remote terminal; and
   transmitting a data carrying message from one of the upstream communication devices to one of the plural remote-connected communication devices via the hub, the satellite and the remote terminal based on the particular correspondence information entry in the correspondence information carrying message.

2. The method according to claim 1, further comprising:
   storing the plural correspondence information entries in a hub database at the hub; and
   storing in the hub database, for each correspondence information entry of the plural correspondence information entries, a terminal identifier of the remote terminal having the MAC address.

3. The method according to claim 2, further comprising:
   transmitting, from the hub to each of the at least one upstream communication devices, device identification messages for each of the MAC addresses stored in the hub database, each device identification message including a different MAC address stored in the hub database and a corresponding virtual network identifier.

4. The method according to claim 1, further comprising:
   transmitting, from the hub to each of the at least one upstream communication devices, device identification messages for each of the MAC addresses in the correspondence information carrying message, each device identification message including a different MAC address and a corresponding virtual network identifier from the correspondence information carrying message.

5. The method according to claim 1, further comprising:
   detecting, by the remote terminal, the data carrying message transmitted to at least one of the plural remote-connected communication devices connected to the remote terminal, the data carrying message identifying a MAC address and an associated virtual network identifier of the one of the plural remote-connected communication devices connected to the remote terminal; and
   storing the particular correspondence information entry in the remote-terminal database, the particular correspondence information entry identifying a correspondence between the MAC address and the associated virtual network identifier of the one of the plural remote-connected communication devices connected to the remote terminal in the detected data carrying message.

6. The method according to claim 5, wherein the detecting is performed when the remote terminal is disconnected from the hub, the method further comprising:
   transmitting the correspondence information carrying message from the remote terminal to the hub when a link is established between the remote terminal and the hub.

7. The method according to claim 1, further comprising:
   transmitting a request message from the hub to the remote terminal; and
   transmitting the correspondence information carrying message in response to the request message.

8. The method according to claim 1, wherein the satellite network further includes another remote terminal, and the remote terminal and the another remote terminal are members of a same virtual network.

9. The method according to claim 1, wherein
   a first remote-connected communication device of the plural remote-connected communication devices is a member of a first virtual network,
   a second remote-connected communication device of the plural remote-connected communication devices is a member of a second virtual network, and
   the remote terminal is a member of the first virtual network and the second virtual network.

10. The method according to claim 1, further comprising:
    transmitting a request message from the hub to the remote terminal when a link is established between the hub and the remote terminal.

11. The method according to claim 5, wherein the data carrying message includes:
    a MAC address of the one of the plural remote-connected communication devices connected to the remote terminal as a destination MAC address;
    a virtual network identifier of the one of the plural remote-connected communication device connected to the remote terminal; and
    a MAC address of the at least one upstream communication device as a source MAC address.

12. The method according to claim 11, further comprising:
    storing, in the remote-terminal database, a correspondence between a connection type of a connection to the one upstream communication device, the MAC address of the one upstream communication device and the virtual network identifier of the one upstream communication device.

13. The method according to claim 2, further comprising:
    transmitting, from the hub to each of the at least one upstream communication devices connected to the upstream switch, device identification messages for each of the MAC addresses stored in the hub database, each device identification message including a different MAC address stored in the hub database and a corresponding virtual network identifier when a link is disconnected between the remote terminal and the hub.

14. The method according to claim 10, wherein the link is established between the hub and the remote terminal in response to a restart process of the hub.

15. The method according to claim 2, further comprising:
    detecting, by the hub, the data carrying message transmitted to at least one of the plural upstream communication devices, the data carrying message identifying a MAC address and a corresponding virtual network identifier of at least one of the at least one upstream communication devices; and storing, in the hub database, a correspondence between an Ethernet connection of the hub, the MAC address and the corresponding virtual network identifier of the at least one of the upstream communication devices in the detected message.

16. The method according to claim 1, wherein the virtual network identifier identifies a virtual network, and the remote terminal and the one of the plural remote-connected communication devices connected to the remote terminal are members of the virtual network.

17. The method according to claim 1, further comprising:
switching, by the hub, the message transmitted from the at least one upstream communication device to the remote terminal based on the virtual network identifier and the MAC address of the correspondence information entry in the correspondence information carrying message.

18. The method according to claim 1, wherein the virtual network identifier identifies a virtual network having an isolated namespace and a private switching table.

19. A method of satellite communication by a terminal in a satellite network including the terminal, a hub, a satellite, at least one upstream communication device, and plural terminal-connected communication devices connected to the terminal, the method comprising:
copying a particular correspondence information entry from a remote-terminal database;
generating a correspondence information carrying message including plural correspondence information entries, the plural correspondence information entries including the particular correspondence information entry and each correspondence information entry of the plural correspondence information entries identifying a virtual network identifier associated with a MAC address of one of the plural terminal-connected communication devices;
transmitting, to the hub via the satellite, the correspondence information carrying message; and
transmitting a data carrying message, from one of the upstream communication devices to one of the plural terminal-connected communication devices via the hub and the satellite, that was generated by the hub based on the particular correspondence information entry in the correspondence information carrying message.

20. A hub device for communicating in a satellite network, the satellite network including the hub, a satellite, a remote terminal, an upstream switch connected to the hub, at least one upstream communication device connected to the upstream switch, and plural remote-connected communication devices connected to the remote terminal, the hub device comprising:
a receiver that receives, via the satellite from the remote terminal, a correspondence information carrying message including plural correspondence information entries, the plural correspondence information entries including a particular correspondence information entry that is copied by the remote terminal from a remote-terminal database into the correspondence information carrying message prior to the remote terminal transmitting the correspondence information carrying message, and each correspondence information entry of the plural correspondence information entries identifying a virtual network identifier associated with a media access control (MAC) address of one of the plural remote-connected communication devices connected to the remote terminal; and
a transmitter that transmits a data carrying message from one of the upstream communication devices to one of the plural remote-connected communication devices via the satellite and the remote terminal based on the particular correspondence information entry in the correspondence information carrying message.

* * * * *